United States Patent
Tsai et al.

(10) Patent No.: US 7,949,988 B2
(45) Date of Patent: May 24, 2011

(54) LAYOUT CIRCUIT HAVING A COMBINED TIE CELL

(75) Inventors: Tung-Kai Tsai, Changhua County (TW); Chih-Ching Lin, Hualien County (TW)

(73) Assignee: Mediatek Inc., Hsin-Chu (TW)

( * ) Notice: Subject to any disclaimer, the term of this patent is extended or adjusted under 35 U.S.C. 154(b) by 505 days.

(21) Appl. No.: 12/060,298

(22) Filed: Apr. 1, 2008

(65) Prior Publication Data

US 2009/0249273 A1 Oct. 1, 2009

(51) Int. Cl.
*G06F 17/50* (2006.01)
*G06F 15/04* (2006.01)
*H03K 19/013* (2006.01)
*H03K 19/00* (2006.01)
*H03K 19/094* (2006.01)

(52) U.S. Cl. .......... 716/139; 716/119; 716/120; 326/27; 326/104; 326/122

(58) Field of Classification Search ............ 716/55, 716/104, 118–120, 122, 132–133, 139; 326/27, 326/104, 122
See application file for complete search history.

(56) References Cited

U.S. PATENT DOCUMENTS

| | | | |
|---|---|---|---|
| 5,623,420 A * | 4/1997 | Yee et al. | 716/1 |
| 6,380,593 B1 | 4/2002 | Maxey et al. | |
| 6,396,306 B2 * | 5/2002 | Dring et al. | 326/104 |
| 7,191,424 B2 * | 3/2007 | Dirks et al. | 716/12 |
| 7,221,183 B2 * | 5/2007 | Chen | 326/27 |
| 2002/0005595 A1 * | 1/2002 | Dring et al. | 257/909 |
| 2002/0167042 A1 * | 11/2002 | Angle et al. | 257/315 |
| 2006/0048079 A1 * | 3/2006 | Dirks et al. | 716/3 |
| 2006/0075369 A1 * | 4/2006 | Dillon et al. | 716/10 |
| 2006/0181307 A1 | 8/2006 | Shibayashi et al. | |
| 2006/0186925 A1 * | 8/2006 | Chen | 326/122 |
| 2006/0268474 A1 * | 11/2006 | Huang et al. | 361/56 |
| 2007/0143725 A1 * | 6/2007 | Dirks et al. | 716/11 |
| 2009/0228855 A1 * | 9/2009 | Dirks et al. | 716/12 |

FOREIGN PATENT DOCUMENTS

CN 1822347 8/2006

OTHER PUBLICATIONS

English abstract of CN1822347, pub. Aug. 23, 2006.

* cited by examiner

*Primary Examiner* — Stacy A Whitmore
(74) *Attorney, Agent, or Firm* — Thomas | Kayden

(57) ABSTRACT

A layout circuit is provided, comprising standard cells, a spare cell, combined tie cells and normal filler cells. The standard cells are disposed and routed on a layout area. The spare cell is added on the layout area and provided for replacing one of the standard cells while adding or changing functions later. The combined tie cells are added on the layout area. The normal filler cells are added on the rest of the layout area. The combined tie cell comprises a tie-high circuit, a tie-low circuit and a capacitance circuit. Some standard cells are disposed near at least one combined tie cell for avoiding routing congestion between the combined tie cells and the replaced standard cell. A circuit layout method is also provided.

16 Claims, 7 Drawing Sheets

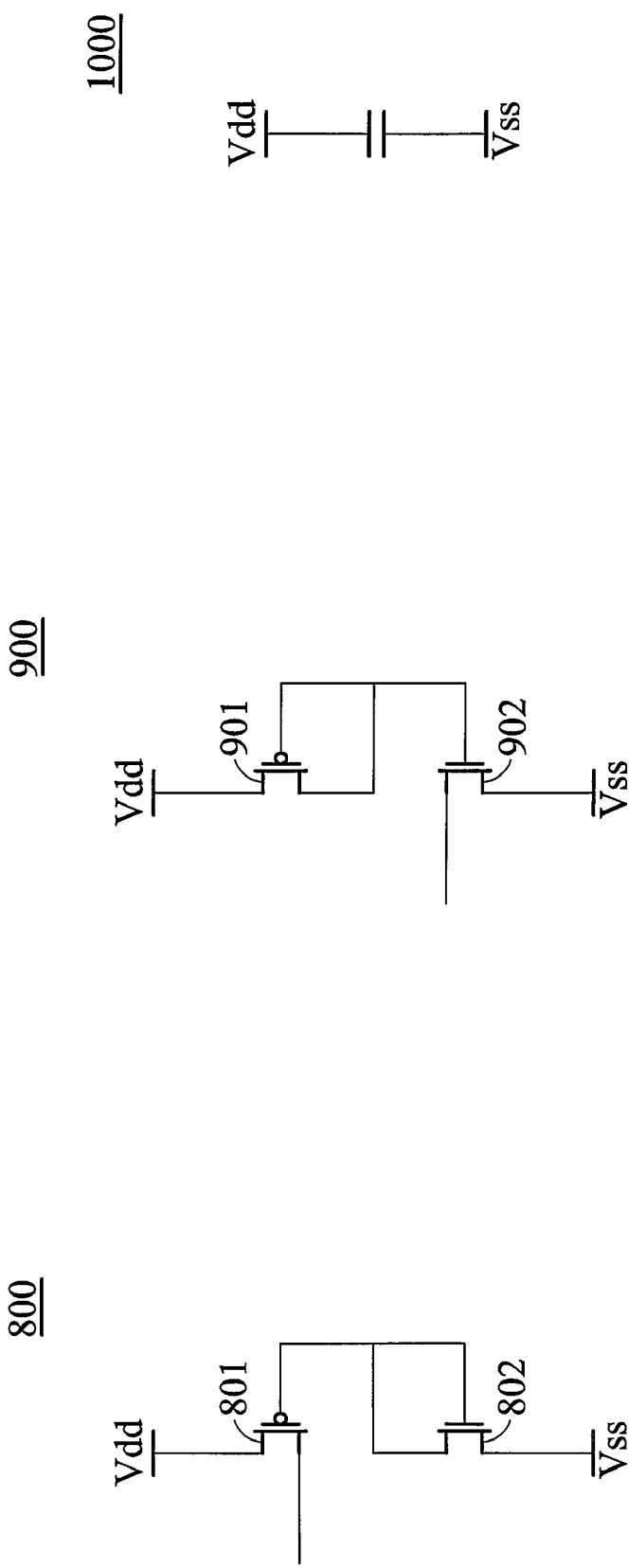

US 7,949,988 B2

LAYOUT CIRCUIT HAVING A COMBINED TIE CELL

BACKGROUND OF THE INVENTION

1. Field of the Invention

The invention relates to circuit layout, and in particular relates to a circuit layout method and a layout circuit with combined tie cells.

2. Description of the Related Art

After design engineers (hereinafter referred to as 'engineers') place and route standard cells on a layout area, engineers usually prepares some spare cells on the layout area for adding more functions or changing design circuits after the chip tap out. However, these spare cells initially do not connect to any standard cells, and thus these spare cells should connect to tie-high cells or tie-low cells in order to avoid floating.

FIG. 1 shows a schematic diagram of one part of layout area 100 of an integrated circuit. There is no standard cell particularly shown on this part of layout area 100. Spare cells A and C are connected to tie-high cells 101 and 103 and spare cell B is connected to a tie-low cell 102. Thus, the voltages provided to spare cells A and C are tied at a high voltage by the tie-high cells 101 and 103, and the voltage provided to spare cell B is tied at a low voltage by the tie-low cell 102. In addition, the rest of the layout area 100 is filled by normal filler cells.

In some cases, using the engineering change order (ECO), engineers will change some functions of the chip after the chip tap out by replacing one of the standard cells with the space cell. FIG. 2 shows a schematic diagram of one part of layout area 200 of an integrated circuit before taking the engineering change order (ECO). Standard cells D and E, respectively corresponding to spare cells D' and E', are coupled to other standard cells (not shown in FIG. 2). Spare cells D' and E' are respectively coupled to tie-high cell D and tie-low cell E to avoid floating. In addition, the rest of the layout area 200 is generally filled by normal filler cells, such as capacitance filler cells.

After chip tap out, engineers may find that the operating of standard cells D and E falls short of their expectations, and therefore engineers use spare cells D' and E' to replace standard cells D and E. FIG. 3 shows a schematic diagram of one part of layout area 200 of an integrated circuit after taking the engineering change order (ECO). Spare cells D' and E', which now are "standard cells" D' and E', are directed to couple to other standard cells (not shown in FIG. 3) which are originally coupled to the standard cells D and E. The replaced standard cells D and E, which now become "spare cells" D and E, are respectively required to couple to the tie cells so as to avoid floating. However, the replaced standard cell D and E may be distant from their corresponding tie cells, thus causing routing congestion.

BRIEF SUMMARY OF THE INVENTION

An embodiment of a layout circuit method is provided. The layout circuit method comprises: placing and routing standard cells on a layout area; adding a spare cell on the layout area, wherein the spare cell is provided for replacing one of the standard cells while adding or changing function; and adding a combined tie cell on the layout area for tying a voltage provided to the replaced standard cell.

Another embodiment of a layout circuit is provided. The layout circuit comprises standard cells disposed on a layout area; a spare cell disposed on the layout area, wherein the spare cell is provided for replacing one of the standard cells; and a combined tie cell disposed on the layout area for tying a voltage provided to the replaced standard cell.

BRIEF DESCRIPTION OF THE DRAWINGS

The invention can be more fully understood by reading the subsequent detailed description and examples with references made to the accompanying drawings, wherein:

FIG. 8 is a tie-high circuit of a combined tie cell according to another embodiment of the invention;

FIG. 9 is a tie-low circuit of a combined tie cell according to another embodiment of the invention; and FIG. 10 is a capacitance circuit of combined tie cell according to another embodiment of the invention.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 4:
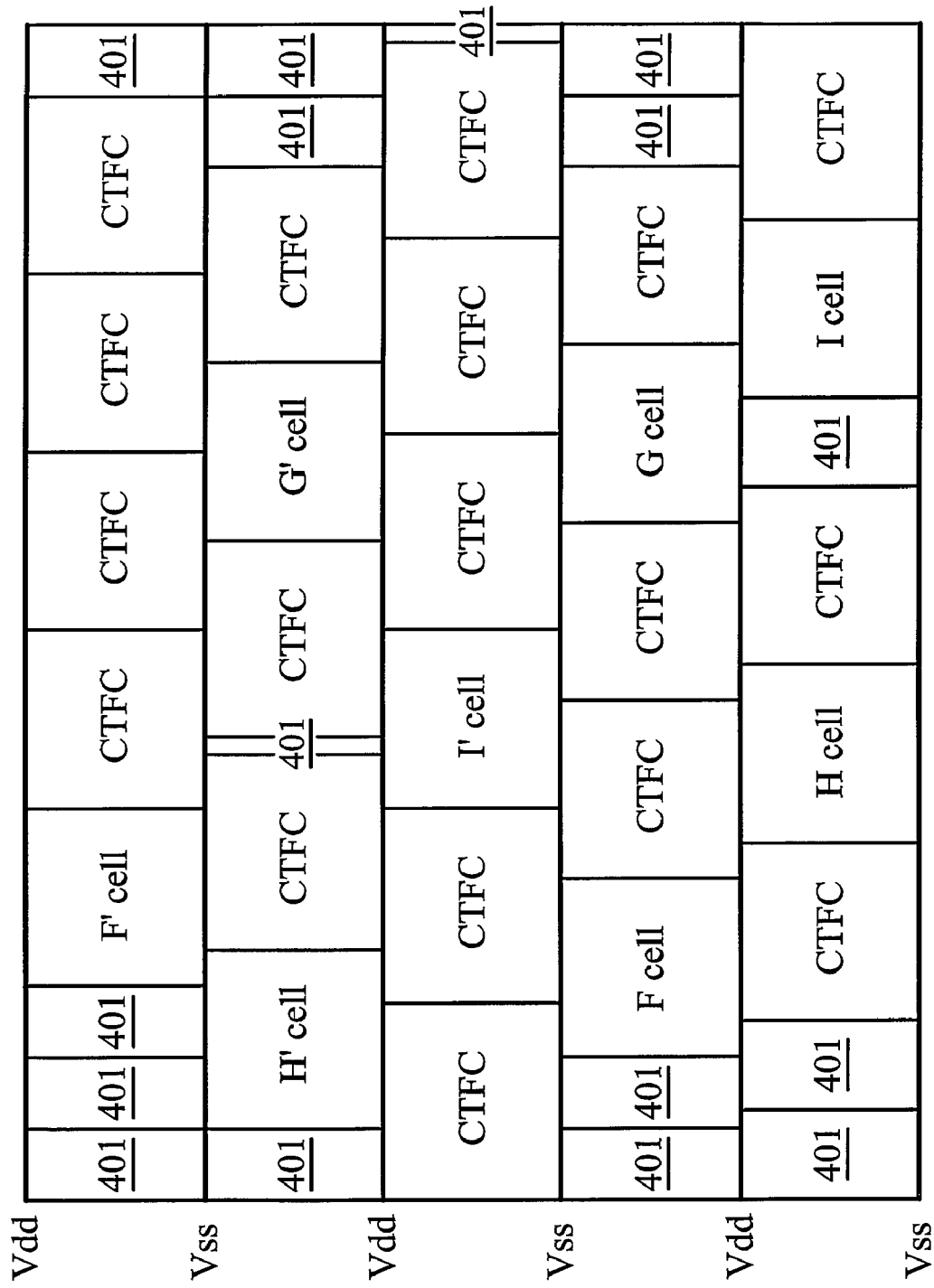
FIG. 4 shows a schematic diagram of one part of a layout area of an integrated circuit according to an embodiment of the invention.

FIG. 4 shows a schematic diagram of one part of layout area 400 of an integrated circuit according to an embodiment of the invention. Firstly, place and route standard cells and add spare cells on layout area 400. Some standard cells F, G, H, I and spare cells F', G', H', I', are shown on this part of layout area 400. Cells F, G, H and I are original standard cells for performing some specific functions of the first-tap-out chip. Spare cells F', G', H' and I' are added for possibly adding more functions or changing design circuits according to the engineering change order (ECO) after the first-tap-out. For example, spare cells F', G', H' and I' may replace original standard cells F, G, H, I after the first-tap-out. Combined tie cells CTFC, which comprises a tie-high circuit and a tie-low circuit, are added on the layout area 400, such as surrounding spare cells F', G', H' and I' and standard cells F, G, H and I. The tie-high circuit (not illustrated in FIG. 4) is arranged to make connection between a first supplied voltage (e.g. Vdd) and the replaced standard cell, for providing a first tied voltage (e.g. a high tied voltage), which may be approximately equal to or lower than the first supplied voltage. The tie-low circuit (not illustrated in FIG. 4) is arranged to make connection between a second supplied voltage (e.g. Vss) and the replaced standard cell, for providing a second tied voltage (e.g. a low tied voltage), which may be approximately equal to or higher than the second supplied voltage. That is, the combined tie cell CTFC is capable of providing what tie voltage the replaced standard cell requires, whether high or low tie voltage. Moreover, according to another embodiment, the combined tie cell CTFC may further comprises a capacitance circuit for voltage stability.

The combined tie cells CTFC are disposed near spare cells F', G', H' and I', standard cells F, G, H and I, or both of them for avoiding routing congestion, meaning that the distance between one combined tie cell CTFC and the spare cell or the standard cell is preferably as short as possible. In this case, combined tie cells CTFC are disposed near standard cells F, G, H and I because standard cells F, G, H and I may be replaced by the corresponding spare cells F', G', H' and I' after the first tapping out. In addition, normal filler cells 401 can be added on the rest of the layout area 400. It is noted that standard cells, combined tie cells CTFC and normal filler cell 401 are coupled between supplied voltages Vdd and Vss.

For example, if standard cells F and G are replaced by spare cells F' and G', the replaced standard cells F and G can be connected to combined tie cells CTFC which are adjacent to the replaced standard cells F and G. Since the combined tie cell CTFC comprises a tie-high circuit and a tie-low circuit, the combined tie cell CTFC can selectively tie a proper voltage (e.g. either high or low) to the replaced standard cell. In some cases, the replaced standard cell has been surrounded by other cells (such as other standard cells), that is, not directly surrounded by or adjacent to any combined tie cell CTFC. However, the replaced standard cell still can be connected to its nearest combined tie cell CTFC. That is, the combined tie cells CTFC should be disposed near the replaced standard cells on the layout area for tying a proper voltage provided to the replaced standard cell. Therefore, the replaced standard cell can be easily connected to at least one combined tie cell.

Figure 1:
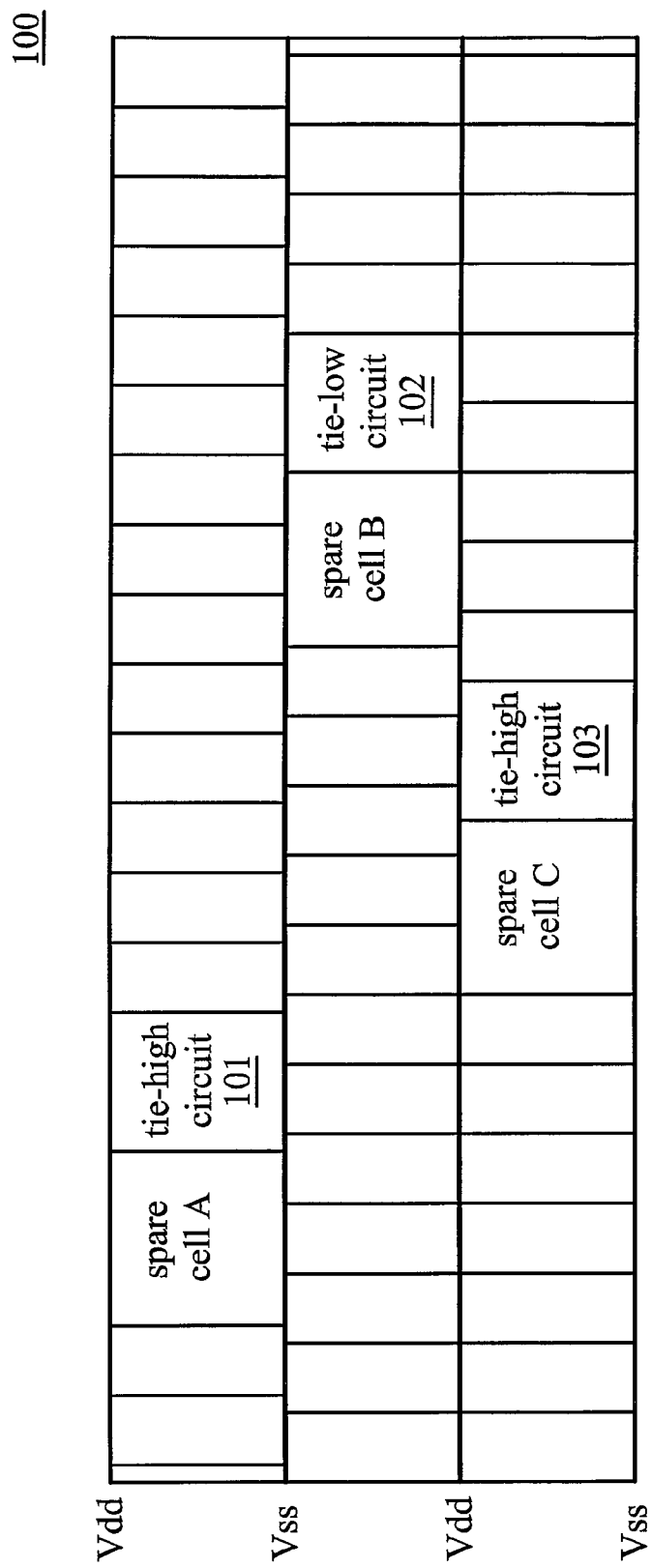
FIG. 1 shows a schematic diagram of one part of a layout area of an integrated circuit.
Figure 2:
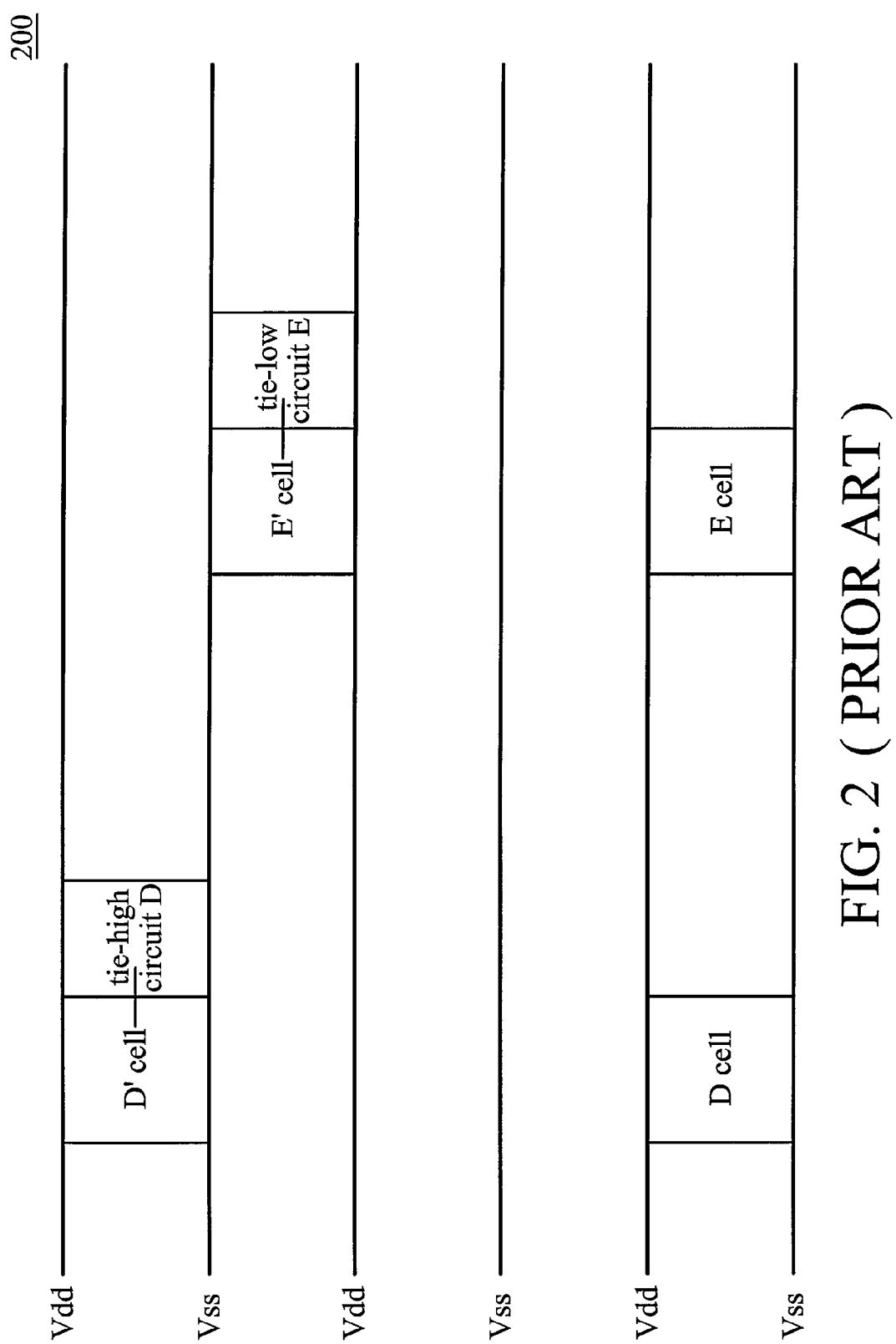
FIG. 2 shows a schematic diagram of one part of a layout area of an integrated circuit before taking the engineering change order.
Figure 3:
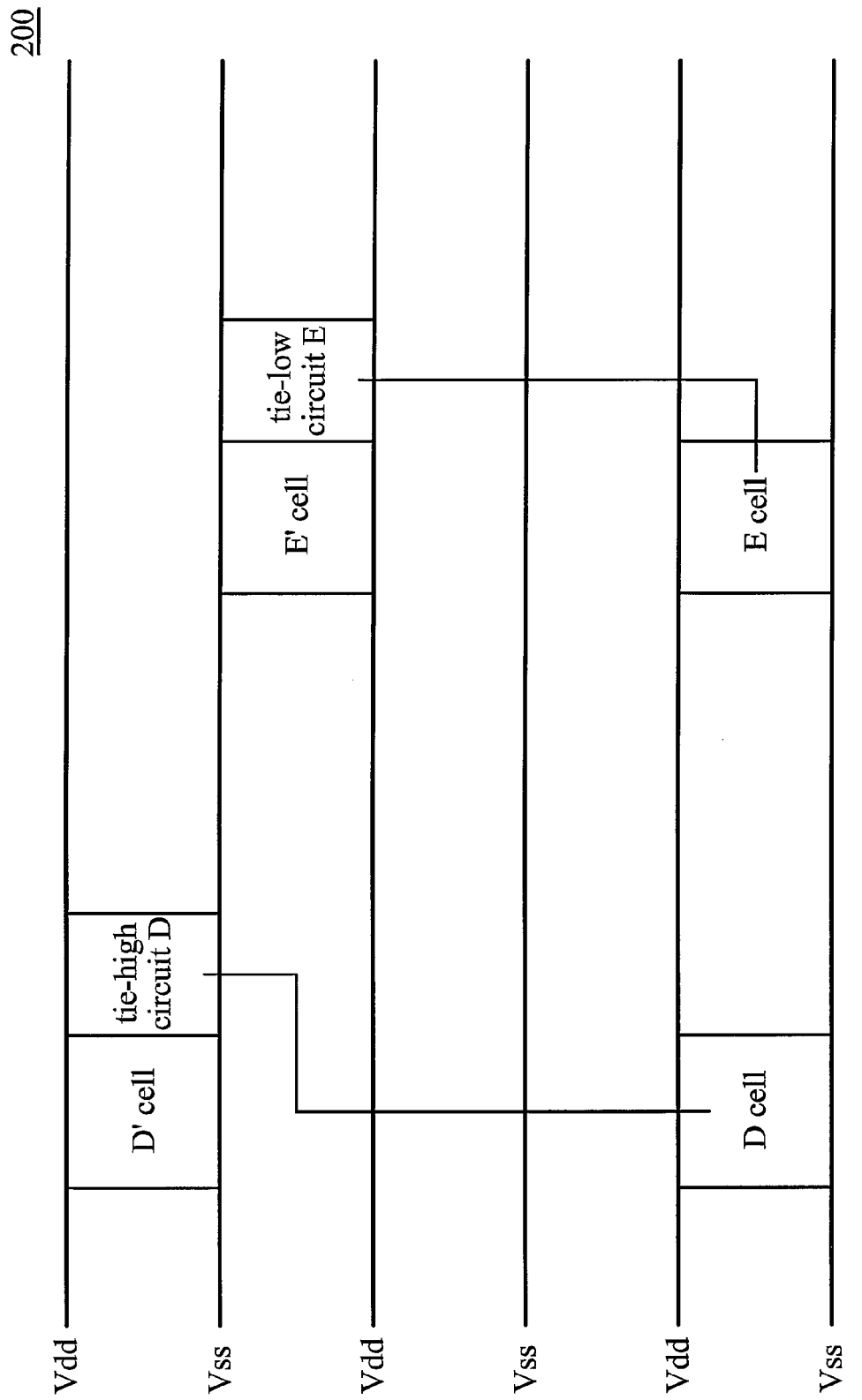
FIG. 3 shows a schematic diagram of one part of a layout area of an integrated circuit after taking the engineering change order.

In another aspect, the combined tie cells CTFC can be added to dispose near the spare cells, such as spare cell F'. By this configuration, if the standard cell F is replaced by spare cell F', the replaced standard cell F at least can find a combined tie cell CTFC near the spare cell F' to tie its required voltage, different from the prior art utilizing the only tie-high cells or tie-low cells shown in FIG. 2.

Accordingly, since some standard cells and spare cells are disposed near combined tie cells CTFC, or even combined tie cells CTFC can be added as much as possible on layout area 400, the routing between standard cells and combined tie cells becomes easy and simple and thus the routing congestion can be mitigated.

Figure 5:
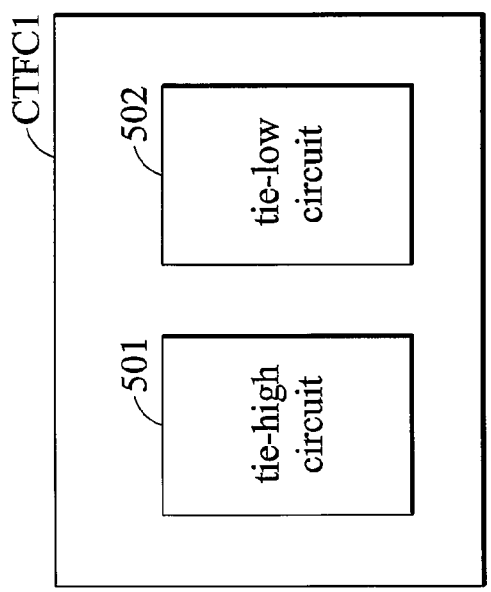
FIG. 5 shows a schematic diagram of a combined tie cell according to an embodiment of the invention.

FIG. 5 shows a schematic diagram of combined tie cell CTFC1 according to an embodiment of the invention. Combined tie cell CTFC1 comprises tie-high circuit 501 and tie-low circuit 502. Combined tie cell CTFC1 can be used in the embodiment of FIG. 4. Referring to FIG. 4, combined tie cells CTFC1 are added on layout area 400 to surround spare cells F', G', H' and I' and standard cells F, G, H and I. Voltages of spare cells F', G', H' and I' and standard cells F, G, H and I can be tied high by tie-high circuit 501 of combined tie cells CTFC1 or tied low by tie-low circuit 502 of combined tie cells CTFC1.

Figure 6:
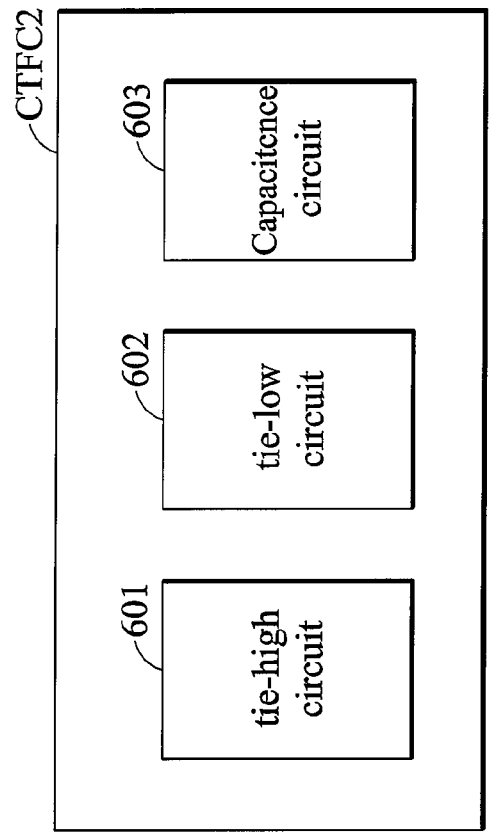
FIG. 6 shows a schematic diagram of a combined tie cell according to another embodiment of the invention.

FIG. 6 shows a schematic diagram of combined tie cell CTFC2 according to another embodiment of the invention. Combined tie cell CTFC2 comprises tie-high circuit 601, tie-low circuit 602 and capacitance circuit 603 for voltage stability. Combined tie cell CTFC2 can be used in the embodiment of FIG. 4. Referring to FIG. 4, combined tie cells CTFC2 are added on layout area 400 to surround spare cells F', G', H' and I' and standard cells F, G, H and I. Voltages of spare cells F', G', H' and I' and standard cells F, G, H and I can be tied high by tie-high circuit 601 of combined tie cells CTFC2 or tied low by tie-low circuit 602 of combined tie cells CTFC2.

Figure 7:
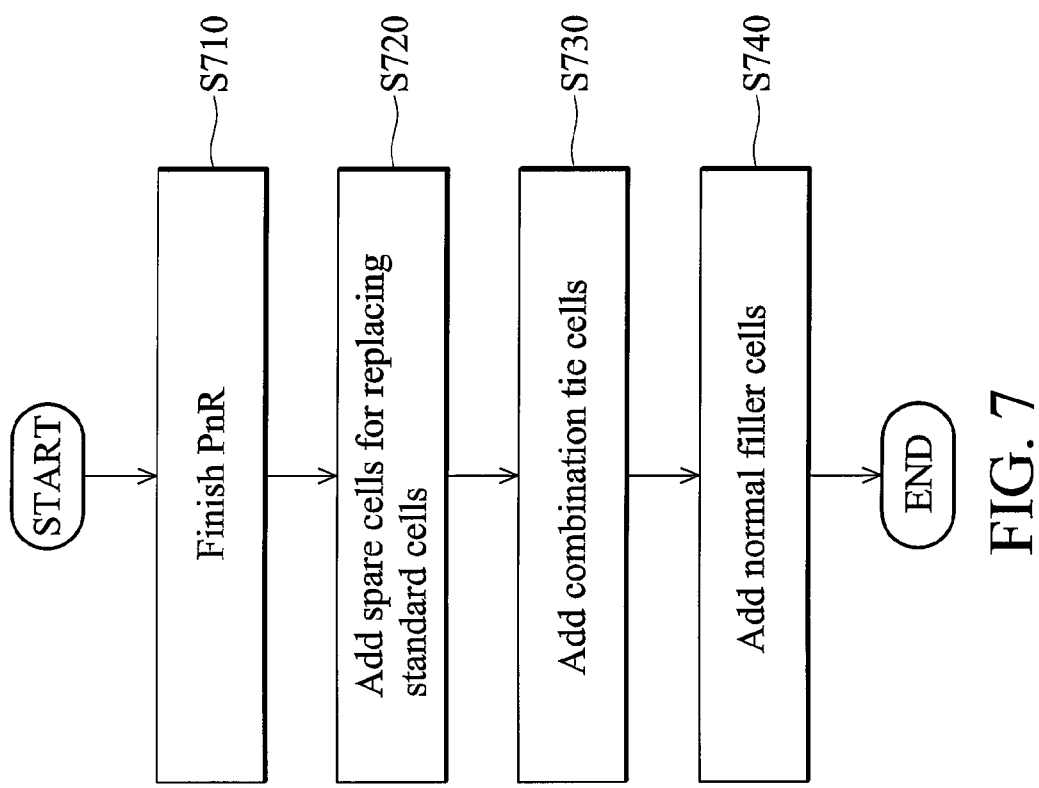
FIG. 7 shows a flow chart of a circuit layout method according to an embodiment of the invention.

FIG. 7 shows a flow chart of a circuit layout method according to an embodiment of the invention. Firstly, placing and routing standard cells on a layout area is finished (step S710). Secondly, spare cells are added on the layout area, and the spare cells are provided for replacing some standard cells while adding or changing function (step S720). Thirdly, combined tie cells are added on the layout area for tying a voltage provided to the replaced standard cell (step S730). Next, normal filler cells are added on the rest of the layout area (step S730). Since configuration and operating principle of standard cell, spare cell and combined tie cell are stated as above, description of them in FIG. 7 is omitted for brevity.

FIG. 8 is a tie-high circuit 800 according to another embodiment of the invention. Tie-high circuit 800 comprises PMOS transistor 801 and NMOS transistor 802. PMOS transistor 801 comprises a source terminal coupled to a supplied voltage Vdd, a gate terminal coupled to the gate terminal of NMOS transistor 802, and a drain terminal for providing a first tied voltage to the corresponding spare cell or standard cell. NMOS transistor 802 comprises a drain terminal, a gate terminal coupled to the drain terminal of the NMOS transistor 802 and the gate terminal of PMOS transistor 801, and a source terminal coupled to a supplied voltage Vss. The supplied voltage Vss can be a negative voltage or ground voltage.

FIG. 9 is a tie-low circuit 900 according to another embodiment of the invention. Tie-low circuit 900 comprises PMOS transistor 901 and NMOS transistor 902. PMOS transistor 901 comprises a source terminal coupled to a supplied voltage Vdd, a gate terminal, and a drain terminal coupled to the gate terminal of PMOS transistor 901. NMOS transistor 902 comprises a drain terminal for providing a second tied voltage to the corresponding spare cell or standard cell, a gate terminal coupled to the gate terminal of the PMOS transistor 901, and a source terminal coupled to a supplied voltage Vss. The supplied voltage Vss can be a negative voltage or ground voltage.

FIG. 10 is a capacitance circuit 1000 according to another embodiment of the invention. Capacitance circuit 1000 is coupled between supplied voltages Vdd and Vss. Supplied voltage Vss can be a negative voltage or ground voltage. Noted that capacitance circuit 1000 may be a real capacitor, a plurality of capacitors coupled in serial or in parallel, or an equivalent circuit, for example, an equivalent capacitance formed by tie-low circuit 900, tie-high circuit 800 or both them coupled in parallel.

The embodiments of the invention, adds as much combined tie cells as possible on the whole layout area of the chip and, more particular, surrounds at least one combined tie cell around the standard cells corresponding to spare cells to avoid routing congestion.

While the invention has been described by way of example and in terms of preferred embodiment, it is to be understood that the invention is not limited to thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:
1. A circuit layout method, comprising:
   placing and routing standard cells on a layout area;
   adding a spare cell on the layout area, wherein the spare cell is provided for replacing one of the standard cells while adding or changing function; and adding a combined tie cell on the layout area for tying a voltage provided to the replaced standard cell, wherein the combined tie cell is independent of the standard cells.

2. The circuit layout method as claimed in claim 1, wherein the combined tie cell comprises a tie-high circuit arranged to make connection between a first supplied voltage and the replaced standard cell and a tie-low circuit arranged to make connection between a second supplied voltage and the replaced standard cell.

3. The circuit layout method as claimed in claim 2, wherein the tie-high circuit comprises:
- a first PMOS transistor comprising a gate terminal, a source terminal coupled to the first supplied voltage, and a drain terminal for providing a first tied voltage; and
- a first NMOS transistor comprising a drain terminal and a gate terminal coupled to the gate terminal of the first PMOS transistor, and a source terminal coupled to the second supplied voltage; and the tie-low circuit comprises:
- a second PMOS transistor comprising a source terminal coupled to the first supplied voltage, and a gate terminal and a drain terminal; and
- a second NMOS transistor comprising a drain terminal for providing a second tied voltage, a gate terminal coupled to the gate terminal and the drain terminal of the second PMOS transistor, and a source terminal coupled to the second supplied voltage.

4. The circuit layout method as claimed in claim 1, wherein the combined tie cell comprises a tie-high circuit arranged to make connection between a first supplied voltage and the replaced standard cell, a tie-low circuit arranged to make connection between a second supplied voltage and the replaced standard cell and a capacitance circuit for voltage stability.

5. The circuit layout method as claimed in claim 1, wherein the combined tie cell is disposed near the replaced standard cell.

6. The circuit layout method as claimed in claim 1, wherein the combined tie cell is disposed near the snare cell.

7. The circuit layout method as claimed in claim 1, wherein a voltage provided to the spare cell is initially tied by the combined tie cell before adding or changing function.

8. The circuit layout method as claimed in claim 1, wherein the spare cell is an OR gate, AND gate, MUX, flip flop or inverter prepared for an engineering change order.

9. A layout circuit, comprising:
standard cells disposed on a layout area;
a spare cell disposed on the layout area, wherein the spare cell is provided for replacing one of the standard cells; and
a combined tie cell disposed on the layout area for tying a voltage provided to the replaced standard cell, wherein the combined tie cell is independent of the standard cells.

10. The layout circuit as claimed in claim 9, wherein the combined tie cell comprises a tie-high circuit arranged to make connection between a first supplied voltage and the replaced standard cell and a tie-low circuit arranged to make connection between a second supplied voltage and the replaced standard cell.

11. The layout circuit as claimed in claim 10, wherein the tie-high circuit comprises:
- a first PMOS transistor comprising a gate terminal, a source terminal coupled to the first supplied voltage, and a drain terminal for providing a first tied voltage; and
- a first NMOS transistor comprising a drain terminal and a gate terminal coupled to the gate terminal of the first PMOS transistor, and a source terminal coupled to the second supplied voltage; and the tie-low circuit comprises:
- a second PMOS transistor comprising a source terminal coupled to the first supplied voltage, and a gate terminal and a drain terminal; and
- a second NMOS transistor comprising a drain terminal for providing a second tied voltage, a gate terminal coupled to the gate terminal and the drain terminal of the second PMOS transistor, and a source terminal coupled to the second supplied voltage.

12. The layout circuit as claimed in claim 9, wherein the combined tie cell comprises a tie-high circuit arranged to make connection between a first supplied voltage and the replaced standard cell, a tie-low circuit arranged to make connection between a second supplied voltage and the replaced standard cell and a capacitance circuit for voltage stability.

13. The layout circuit as claimed in claim 9, wherein the combined tie cell is disposed near the replaced standard cell.

14. The layout circuit as claimed in claim 9, wherein the combined tie cell is disposed near the spare cell.

15. The layout circuit as claimed in claim 9, wherein a voltage provided to the spare cell is initially tied by the combined tie cell before the spare cell replaces one of the standard cells.

16. The layout circuit as claimed in claim 9, wherein the spare cell is an OR gate, AND gate, MUX, flip flop or inverter prepared for an engineering change order.

* * * * *